US006848618B1

(12) United States Patent
Krul

(10) Patent No.: US 6,848,618 B1
(45) Date of Patent: Feb. 1, 2005

(54) SECURITY FACILITY AND USES THEREOF

(75) Inventor: Johannes Krul, Meerkoetlaan (NL)

(73) Assignee: VHP Veiligheidspapierfabriek Ugchelen B.V., Gl Apeldoorn (NL)

( * ) Notice: Subject to any disclaimer, the term of this patent is extended or adjusted under 35 U.S.C. 154(b) by 0 days.

(21) Appl. No.: 09/926,356

(22) PCT Filed: Apr. 14, 2000

(86) PCT No.: PCT/NL00/00243

§ 371 (c)(1), (2), (4) Date: Dec. 20, 2001

(87) PCT Pub. No.: WO00/65545

PCT Pub. Date: Nov. 2, 2000

(30) Foreign Application Priority Data

Apr. 22, 1999 (NL) ........................................ 1011860

(51) Int. Cl.$^7$ ........................................ G06K 19/06

(52) U.S. Cl. ........................ 235/492; 235/487; 283/72

(58) Field of Search ........................ 235/492, 375, 235/380, 487, 494; 283/70, 72, 74, 83, 107

(56) References Cited

U.S. PATENT DOCUMENTS 4,652,015 A * 3/1987 Crane ........................ 283/91
4,870,260 A * 9/1989 Niepolomski et al. ...... 235/381
4,943,093 A * 7/1990 Melling et al. .............. 283/83
5,161,829 A * 11/1992 Detrick et al. .............. 283/91
5,255,129 A * 10/1993 Jones ........................ 235/449
5,682,103 A * 10/1997 Burrell ...................... 324/642

FOREIGN PATENT DOCUMENTS

DE 4136877 * 5/1993 .......... G02R/31/00
EP 0 019 191 11/1980
EP 0 905 657 3/1999

* cited by examiner

*Primary Examiner*—Daniel Stcyr
(74) *Attorney, Agent, or Firm*—Westerman, Hattori, Daniels & Adrian LLP

(57) ABSTRACT

In a security facility according to the invention for use as security in paper substrates, such as security and value documents, value and banknote paper and the like, said security facility comprising a non-conducting plastic support, on which at least two conducting areas spaced apart are provided, the at least two conducting areas spaced apart are electrically interconnected by at least one diode connection with a predefined conducting direction.

32 Claims, 2 Drawing Sheets

SECURITY FACILITY AND USES THEREOF

The present invention relates to a security facility for use as security in substrates, such as security and value documents, security, value and banknote paper and the like, said security facility comprising a non-conducting plastic support, on which at least two conducting areas spaced apart are provided.

BACKGROUND OF THE INVENTION

A security facility of this type in the form of a security thread is known, for example, from WO 95/26884. In this known security thread, which comprises a plastic thread as a support with a covering metal layer, breaks in the metal layer are disposed at right angles to the longitudinal direction of the A thread, so that the conducting metal parts thus formed form areas which are electrically insulated from one another. These metal parts, together with the breaks, form a type of bar code, which can be read with detectors specifically developed for that purpose. Furthermore, this security facility is also machine-readable due to the conducting characteristics of the metal areas.

A similar type of security thread is also already known from GS-A-1353244. In this known security facility, the metal covering layer, which is present on one or both sides of a plastic thread, is similarly broken in a regular manner. If a two-sided metal layer is provided, the position of the breaks can be selected in such a way that a pattern of partially overlapping metal areas is formed. A pattern of this type can be detected in a specific manner.

As well as the aforementioned machine-readable functions, which can be regarded as hidden features, the metallized plastic thread also functions as a public feature. Security threads of this type in fact reveal an optical effect, known in the art as an “optically variable effect”. This effect is based on the fact that a metallized thread, when incorporated into a paper mass, reveals a reflection, which differs only slightly from the reflection of the paper mass itself. The presence of the thread is therefore barely evident in reflected light. However, in transmitted light, the thread reveals itself as a clearly perceptible dark line. This effect is difficult for forgers to imitate using existing copying techniques.

The aforementioned machine-detectable characteristics are based on the normal conduction characteristics of the conducting parts of the thread. However, this conducting behaviour is very simple to imitate by placing a conducting material in the correct position, for which many materials come into consideration, such as, for example, metal-based printing inks and pastes. Even the simplest imitation of a completely hidden metallized plastic security thread, namely a (faint) black-lead strip, shows conduction, since graphite is a good conductor. Similarly, the window-design of a metallized security thread, such as, inter alia, that known from GB-A-1 552 853, EP-A-0 059 056 and DE-A-19 70 604.9, can be imitated, for example by the so-called “stamping” of a metal foil on a banknote. These imitations may reveal electrically conducting behaviour which corresponds to that of the metal-containing security thread, depending on the measurement method which is employed. In practice, therefore, conduction, as a machine-readable characteristic of the security thread, offers only a simple security feature.

Furthermore, it is known that measurement of conduction over longer distances causes problems in a thread with a metal layer on one side only, as a result of the presence of breaks, cracks and the like in the metal. Interruptions of this type may arise as a result of the production method, for example the incorporation of the thread in, for example, a paper substrate, and as a result of daily use. The risk of the occurrence of breaks is even greater in a security thread according to EP-A-0 319 157, in which, in a continuous metal layer, symbols, characters and the like are provided in the form of (metal-free) indentations, which are surrounded by relatively narrow metal parts. These narrow metal parts are particularly prone to breaking.

Furthermore, security threads in which conducting plastics are used are also known. Examples of these are described in EP-A-0 330 733 nd EP-A-0 753 623.

SUMMARY OF THE INVENTION

The object of the present invention is to produce a security facility in which the security possibilities are extended.

In the security facility according to the present invention of the type described above, the at least two separate conducting areas are electrically interconnected by means of at least one diode connection with a predefined conducting direction.

In the security facility according to the present invention, which can be used, for example, in paper substrates, such as security and value documents, security, value and banknote paper, use is made of semiconductor junctions between conducting “islands” at well-defined positions on the security facility, and upon application of well-defined positions in or on the substrate. Junctions of this type cannot be imitated by forgers by simply applying conducting metal parts to the substrate.

In contrast to hitherto known security facilities such as security threads, in which, in the authenticity evaluation, only the absence or presence of conducting parts is determined, the direction of conduction is determined in the authenticity evaluation of the security facility according to the invention.

It is noted that, in the present invention, no fully integrated circuit is used in the security facility, such as that present in an IC, but use is made of the specific functionality of diode connections, including the conducting or non-conducting direction specific to diodes, and the higher harmonics generally regarded in electronics as a hindrance, which can be measured after supplying a diode with a specific frequency.

In this context, it is noted that, in the present description, “paper” is to be understood as a product which is manufactured from natural fibres, comprising entirely natural polymers, from natural fibres mixed with synthetic fibres, or from entirely synthetic polymers. Synthetic polymers are currently used for the production of totally “plastic” security paper, banknotes and the like.

Furthermore, the term “substrate” is understood to mean matrices which are based on the aforementioned materials, and which can be used as the basis for the production of security documents, banknote paper and the like.

The security facility according to the invention may assume any form like for example, a security thread, an optically active/variable structure, a foil provided with specific optical diffraction and/or reflection such as a foil stripe.

The basic design of the security facility according to the invention comprises two conducting areas spaced apart, which are applied to a non-conducting plastic support and are interconnected by means of a direction-specific component. The conducting direction, and therefore also the non-conducting direction, must be previously known, so that the security facility can be fitted on or in the substrate with the correct orientation, and the conducting direction(s) can be measured in the authenticity evaluation.

Preferred embodiments of the security facility according to the present application are defined in the subclaims.

Inorganic semiconductor materials may be considered as the semiconductor materials for the diode connections used in the invention, for example the conventional (silicon) diode with a p-n junction. Furthermore, organic semiconductor polymers may be specified, preferably in the form of the so-called "MISFET" diode. The choice of a specific type of semiconductor material will depend, inter alia, on the substrate in which the security facility according to the invention is incorporated, and also the intended use of the substrate.

The conventional diode comprising inorganic semiconductor material must be applied to a sufficiently strong substrate/medium, since the mechanical strength is low as a result of the intrinsic brittleness of the inorganic material. Such a security facility according to the invention is therefore of a type such that it is less suitable for applications in which the mechanical load through use is high and/or the thickness must be small, such as in banknotes, in which the maximum thickness is approximately 100 micrometres. For other applications in which mechanical load and/or thickness are of little significance, such as in a cover, envelope or substrate, which is intrinsically sufficiently thick so that the security facility can be easily integrated into the paper mass, a security facility comprising an inorganic diode can be appropriately used.

The aforementioned difficulties of the thickness and mechanical strength of the inorganic diode do not occur if the diode is produced from organic polymer semiconductor materials. Creases and folds, as in used banknotes, do not affect the integrity of a semiconductor material made of organic polymer. Furthermore, diodes of this type can be fitted to a non-conducting plastic support, in which the total thickness of the security facility is primarily determined by the thickness of the support. The thickness can thus be adapted in a simple manner to the thickness of the surrounding substrate. A security facility of this type has a unique combination of characteristics, namely high mechanical strength and conductivity with a specific direction dependence. Furthermore, the costs of a security facility of this type remain at an acceptable level. A diode produced from organic semiconductor polymers will generally be protected by a chemically inert protective layer in order to maintain the functionality of the diodes during its normal life time:

The security facility, for example a security thread, may have one or more diode connections. The facility or parts thereof reveal direction-dependent conduction. The conducting direction may change a number of times for each thread in a document, depending on the part of the thread concerned and therefore the non-conducting direction of the diode in the thread segment which is being measured at that time. If junctions of this type are inserted into a metallized thread, the latter appears at first sight as a simple security thread containing one or more, more or less clearly perceptible interruptions in the metal layer. These interruptions advantageously run from one long side of a thread to the other long side, preferably at right angles to the longitudinal direction of the thread; however, other ways of insulating the successive conducting parts are also possible.

It will be understood that the conducting areas spaced apart of the security facility according to the invention, which _are interconnected by means of direction-dependent conductors, may be made not only of metal, but also of metal and conducting polymers, or of conducting polymers alone. If conducting areas of both metal and polymer are present, these areas may (partially) overlap one another.

A plurality of diodes are preferably present for each diode connection between conducting areas, so that, if one diode unexpectedly fails, the direction-specific conduction behaviour of the security facility or parts thereof is not lost. In one embodiment of the security facility, a number of conducting areas are present on the non-conducting plastic support, which are interconnected in series by means of at least one diode connection per junction with a predefined conducting direction.

A diode connection may comprise a number of rectified, identical diodes. In a different variant, the diode connection comprises an odd number of counter-rectified, identical diodes. In such a case, the final result is a well known conducting direction. In still another embodiment the connection between the conducting areas comprises an equal number of counter-rectified identical diodes, the result being no net conduction between the conducting areas.

The direction of conduction in a given connection between conducting areas via the diode is a measurable authenticity feature. It is therefore possible to provide the security facility with a binary code, in which the conducting direction towards a given side is represented by a zero (0) and the opposite conducting direction is represented by a one (1). The direction of conduction is therefore a determining factor in this coding method. In addition, the length of the separate conducting parts between the junctions may also be included in the evaluation algorithm which is used for the authenticity evaluation by allocating a specific value to the length of an area conducting in one direction, thereby creating an additional code. The detected direction of conduction, as well as the measured length, whether both encoded or not, may then be compared with a reference, which is stored, e.g. in the memory of the evaluation unit, such as a sorting device and the like.

If the security facility, for example in the shape of a security thread, is incorporated in banknotes, the previously known direction-dependent conduction behaviour also offers the option of determining the orientation of the notes. An orientation determination of this type may be favourable in sorting methods and devices, in which the notes may be offered with four orientations.

The direction of conduction in the security facility according to the present invention may be measured via a direct contact measurement, or remotely via capacitive or inductive coupling, as understood by the person skilled in the art. In the case of direct measurement of the conducting direction, the security facility will be provided with directly accessible electrical read-out contacts, preferably in the form of highly conductive metal contacts, which are made of metals which do not readily form an insulating metal oxide. Oxide formation is insignificant in the case of read-out contacts made from conducting polymers. However, with these materials, there is a greater risk of mechanical damage as a result of the read-out, which may result in deficiently conducting read-out contacts.

Contactless read-out is therefore preferable, since the aforementioned problems do not occur here; in this way, the direction-dependent conducting junctions concealed in the security facility can also be accurately measured. For security facilities according to the present invention, which are used in or on value, security and banknote paper, contactless read-out by means of a capacitively coupled system is preferable due to the small thickness of the substrate. The object must then be examined very closely. An inductive system offers the possibility of coupling at greater distance and can therefore be used with substrates of sufficient thickness. However, for substrates with thicknesses up to approximately 100 micrometres, capacitive measurement is still preferable since, with inductive measurement, the coil required for that purpose in the substrate is currently disproportionate to the thickness of the substrates and may furthermore create an aesthetic problem. However, if the coil material could be made in such a way that the coil dimensions do not interfere with the thickness of the substrate, then inductive coupling would offer a good alternative for a capacitative coupling.

The security facility according to the invention may also be combined with existing security features. The facility may be provided with characterizing colour or fluorescence characteristics. These additional aspects may be incorporated in the (transparent) plastic support or may be fully integrated into the conducting areas, for example comprising organic polymer, without affecting the conductivity thereof. The coloured and/or fluorescent connections may also be fitted to the side of the support which is not provided with conducting areas, or as a separate layer below or above the conducting areas. Combinations thereof are also possible.

If the conducting areas are made from metal, these may advantageously comprise signs completely surrounded by metal, such as symbols, characters, letters and digits, said signs themselves being metal-free, but may, if required, comprise underlying transparent conducting polymer. The latter case will involve some overlap between metal and polymer. Signs of this type may be visible either to the naked eye, or through magnification. Signs visible to the naked eye form a public feature, whereas signs invisible to the naked eye may also serve as a machine-readable feature.

In an alternative embodiment, the metal conducting areas themselves form one or more characters which are interconnected by means of diodes.

The conducting areas of organic polymers may advantageously be printed with so-called "microprint".

The invention also relates to banknote paper and value documents, which comprise a security facility, particularly a security thread, according to the invention.

Furthermore the invention relates to an authenticity evaluation method as defined in claims 16–18.

BRIEF DESCRIPTION OF THE DRAWINGS

The invention is explained below with reference to the attached drawing, in which:

FIG. 3 shows a paper substrate 1 indicated by reference number 1. A security thread 3, which is arranged in the width direction b of the substrate 1, is visible in the paper mass in windows 2. Furthermore, a flower-shaped safety facility 4, comprising a thin foil which may or may not be provided with optically active structures or reflections, is fitted according to the invention on one of the corners of the substrate 1. The structures of the security thread 3 and security facility 4 are explained below with reference to the remaining figures.

Figure 2:
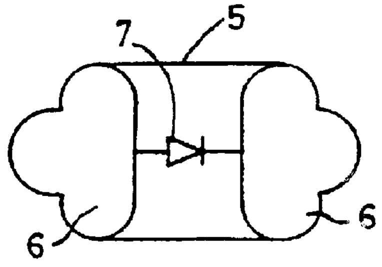
FIG. 2 is a top view of a security facility according to the invention.

The part of a security facility according to the invention which is shown in FIG. 2 comprises a non-conducting plastic support 5 with, in this case, two spaced apart conducting (metal) areas 6. These areas 6 are electrically interconnected by means of a diode 7. In the situation shown, the conducting direction is from left to right.

Figure 3:
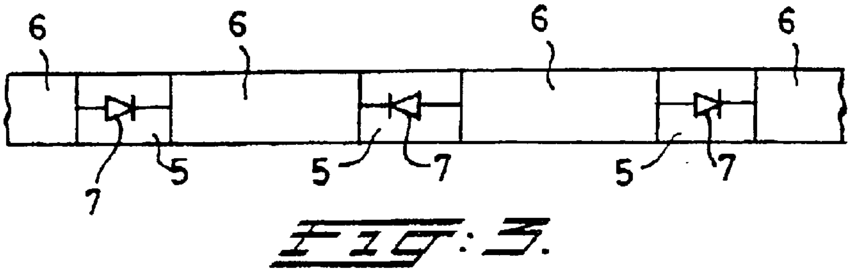
FIG. 3 is a top view of an embodiment of a security thread according to the invention.

In the security thread shown in FIG. 3, a number of conducting (metal) areas 6 of identical length, which are interconnected by means of diodes 7, are provided on the non-conducting support 5. In the situation shown, the conducting direction of successive diode connections alternates.

In a first variant of the security thread shown in FIG. 3, the conducting areas 6 have different lengths, to which a specific value can be allocated, which can be incorporated in the evaluation algorithm. In a second variant of the security thread shown in FIG. 3, the conducting areas 6 have the same length, but the areas are connected in a repetitive manner by, consecutively, two rectified diodes and one counter-rectified diode, so that, taken as a whole, the areas which conduct in a specific direction are greater than the parts which conduct in the opposite direction.

Figure 4:
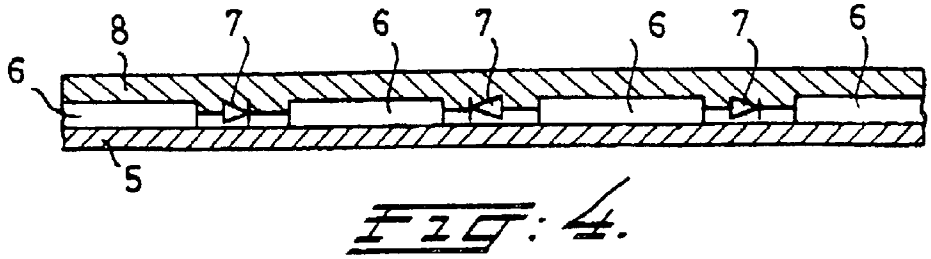
FIG. 4 is a longitudinal section of a different embodiment of a security thread according to the invention.

FIG. 4 shows a cross section of a further embodiment of a security thread according to the invention, in which a nontransparent covering layer 8 is provided on the diodes 7 and the conducting areas 6, so that, in both reflected and transmitted light, the thread is visible as a continuous unbroken line.

Figure 5:
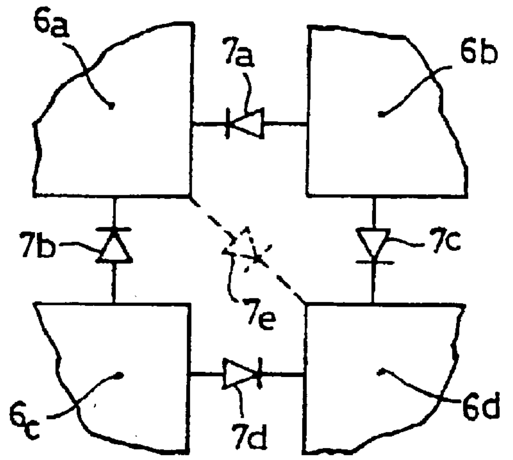
FIG. 5 shows a top view of a further embodiment of a security facility according to the invention.

In the part of an embodiment of a security facility according to the invention shown in FIG. 5, which may take the form of a security thread, an optically active element, such as a so-called "stripe" (a (metallized) optically active structure in the form of a relatively wide strip, which is attached to the object which is to be protected), four spaced apart conducting areas 6*a–d* thereof, which are interconnected by means of diode connections 7*a–d*, are shown. The totality of these connections produces a conducting pattern which is unique to this security facility, based on the underlying design of conducting devices. Reference number 7*e* indicates a further diode connection, which connects the area 6*a* to 6*d*. The part shown in FIG. 5 may be repeated in the security facility, or may be alternated with other coded circuits.

Figure 6:
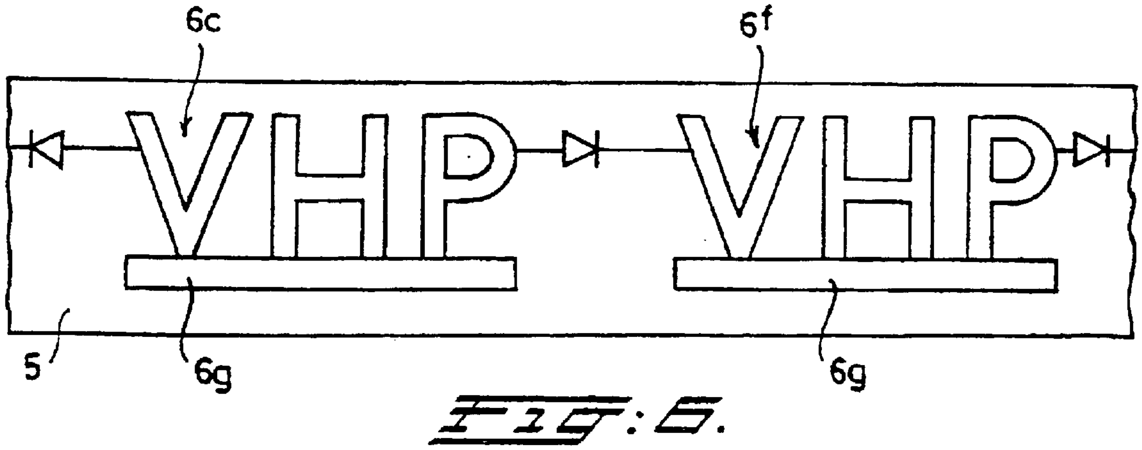
FIG. 6 shows a top view of a different embodiment of a security facility according to the invention.

FIG. 6 shows a further embodiment of a security facility according to the invention in the form of a thread-shaped structure, in which the conducting areas 6*e–f* take the form of, in this case, letters, which letters are connected within one area 6*e* or 6*f* respectively by means of a strip of conducting material 6*g*. The conducting material of, on the one hand, the letters 6*e* and 6*f* may or may not be identical to the conducting material of the strip 6*g*. The letters (which may also be symbols, etc.), are preferably made from metal, so that the optically variable effect is also present.

Figure 1:
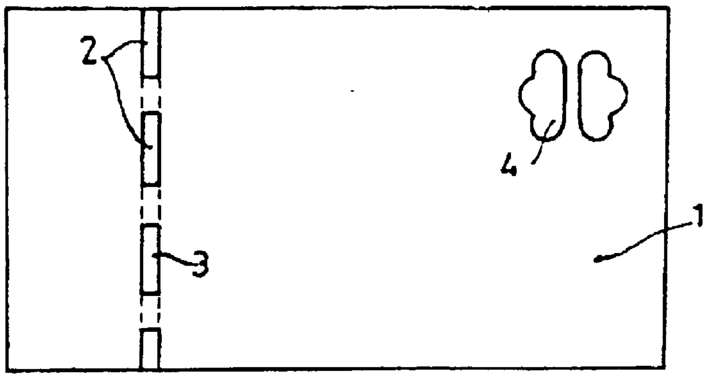
FIG. 1 is a schematic top view of a substrate provided with a security facility according to the invention in the form of a security thread and foil.

In the case of the foil 4 from FIG. 1 and a stripe (not shown), the interruptions and the diode connections may or may not be visible to the naked eye.

What is claimed is:

1. An authenticity evaluation method of substrates having a security facility, said security facility consisting essentially of a non-conducting plastic support, on which at least two conducting areas spaced apart are provided, wherein the at least two conducting areas spaced apart of the security facility are directly electrically interconnected by means of respective connections with a predefined conduction direction, said method at least comprising the step of detecting the conducting direction of the security facility, and comparing the detected conducting direction with a reference conducting direction.

2. The authenticity evaluation method according to claim 1, comprising the further steps of measuring the size of a section of the security facility, which section has a conduction in one direction, and comparing the size thus measured with a reference size.

3. The authenticity evaluation method according to claim 1 or 2, wherein a number of conducting areas are present on the non-conducting plastic support, which are interconnected in series by means of respective diode connections with a predefined conducting direction.

4. The authenticity evaluation method according to claim 1 or 2, wherein a diode connection comprises a number of rectified, identical diodes.

5. The authenticity evaluation method according to claim 1 or 2, wherein one or more diodes of a diode connection is/are made from organic semiconductor polymers or inorganic semiconductor materials.

6. The authenticity evaluation method according to claim 1 or 2, wherein the non-conducting support is a plastic thread.

7. The authenticity evaluation method according to claim 1 or 2, wherein the security facility is selected from, a security thread or an optically variable device, a foil provided with specific optical diffraction and/or reflection such as a foil stripe.

8. The authenticity evaluation method according to claim 1 or 2, wherein the conducting areas comprise metal, these metal areas consisting of signs entirely surrounded by metal, said signs themselves being metal-free.

9. The authenticity evaluation method according to claim 8, wherein the signs form a repetitive pattern.

10. The authenticity evaluation method according to claim 1 or 2, wherein the metal of the metal areas takes the form of signs.

11. The authenticity evaluation method according to claim 1 or 2, wherein the conducting areas are made from organic conducting polymers.

12. The authenticity evaluation method according to claim 11, wherein the conducting areas comprising organic conducting polymers are printed with small characters from a printing medium.

13. The authenticity evaluation method according to claim 1 or 2, wherein the conducting areas are constructed from organic polymers and metal.

14. An authenticity evaluation system for evaluation of the authenticity of substrates having a security facility, the system comprising:

a substrate having a security facility, which security facility consists essentially of a non-conducting plastic support, on which at least two conducting areas spaced apart are provided, wherein the at least two conducting areas spaced apart are directly electrically interconnected by means of respective diode connections with a predetermined conducting direction; and means for detecting the conducting direction of the security facility and for comparing the detected conducting direction with a reference conducting direction.

15. A permanent security facility for use as security in substrates, in an authenticity evaluation method comprising multiple steps of detecting the conducting direction of the security facility, and comparing the detected conducting direction with a reference conducting direction, said permanent security facility consisting essentially of a non-conducting plastic support, on which at least two conducting areas spaced apart are provided, wherein the at least two conducting areas spaced apart are directly electrically interconnected by means of respective diode connection with a predefined conducting direction, such that said security facility can be checked multiple times.

16. A security paper, comprising a permanent security facility, said security paper having a value that is independent from said security facility, said permanent security facility consisting essentially of a non-conducting plastic support, on which at least two conducting areas spaced apart are provided, wherein the at least two conducting areas spaced apart are directly electrically interconnected by means of respective diode connections with a predefined conducting direction, such that said security facility can be checked multiple times.

17. The security paper according to claim 16, which is banknote paper.

18. The security paper according to claim 16, wherein a number of conducting areas are present on the non-conducting plastic support, which are interconnected in series by means of respective diode connections with a predefined conducting direction.

19. The security paper according to claim 16, wherein a diode connection comprises a number of rectified, identical diodes.

20. The security paper according to claim 16, wherein one or more diodes of a diode connection is/are made from organic semiconductor polymers or inorganic semiconductor materials.

21. The security paper according to claim 16, wherein the non-conducting support is a plastic thread.

22. The security paper according to claim 16, wherein the security facility is selected from, a security thread or an optically variable device, a foil provided with specific optical diffraction and/or reflection such as a foil stripe.

23. The security paper according to claim 16, wherein the conducting areas comprise metal, these metal areas consisting of signs entirely surrounded by metal, said signs themselves being metal-free.

24. The security paper according to claim 16, wherein the metal of the metal areas takes the form of signs.

25. The security paper according to claim 24, wherein the signs form a repetitive pattern.

26. The security paper according to claim 16, wherein the conducting areas are made from organic conducting polymers.

27. The security paper according to claim 26, wherein the conducting areas comprising organic conducting polymers are printed with small characters from a printing medium.

28. The security paper according to claim 16, wherein the conducting areas are constructed from organic polymers and metal.

29. The security paper according to claim 16, wherein a plurality of diodes are present for each diode connection between conducting areas.

30. The security paper according to claim 16, herein the security facility is coded.

31. The security paper according to claim 30, wherein the security facility is coded for determination of an orientation of the security paper.

32. Permanent security facility for use as security in substrates, for use in an authenticity evaluation system comprising means for detecting the conducting direction of the security facility and for comparing the detected conducting direction with a reference conducting direction, said permanent security facility consisting essentially of a non-conducting plastic support, on which at least two conducting areas spaced apart are provided, wherein the at least two conducting areas spaced apart are directly electrically interconnected by means of respective diode connection with a predefined conducting direction, such that said security facility can be checked multiple times.

* * * * *